Figure 1:
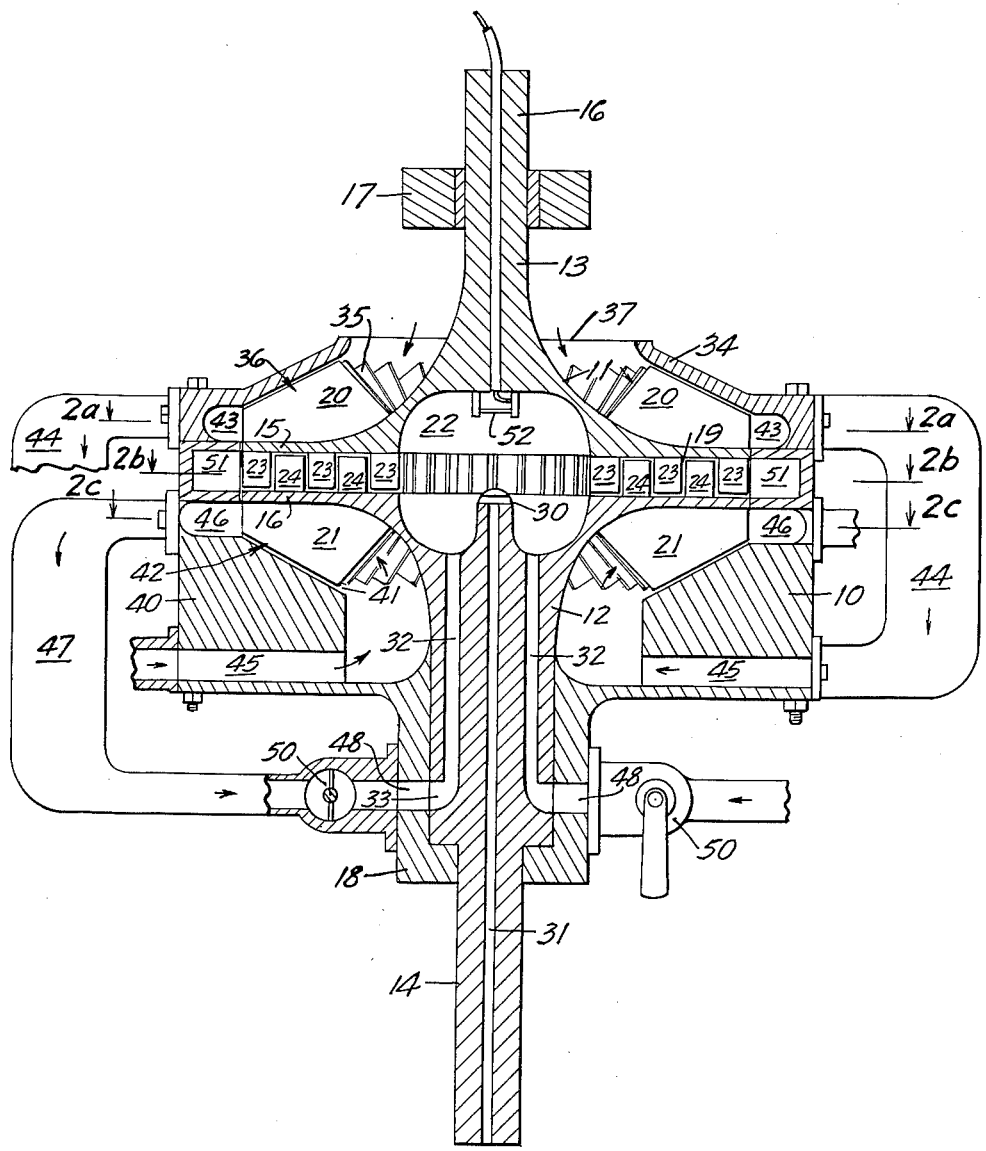

April 3, 1962

C. L. PARKER 3,027,716

RADIALLY-EXPLODING GAS TURBINE ENGINE

Filed July 12, 1960

3 Sheets-Sheet 1

INVENTOR
CRAIG L. PARKER
BY
Stanley S. De Jo Hunt
ATTORNEY

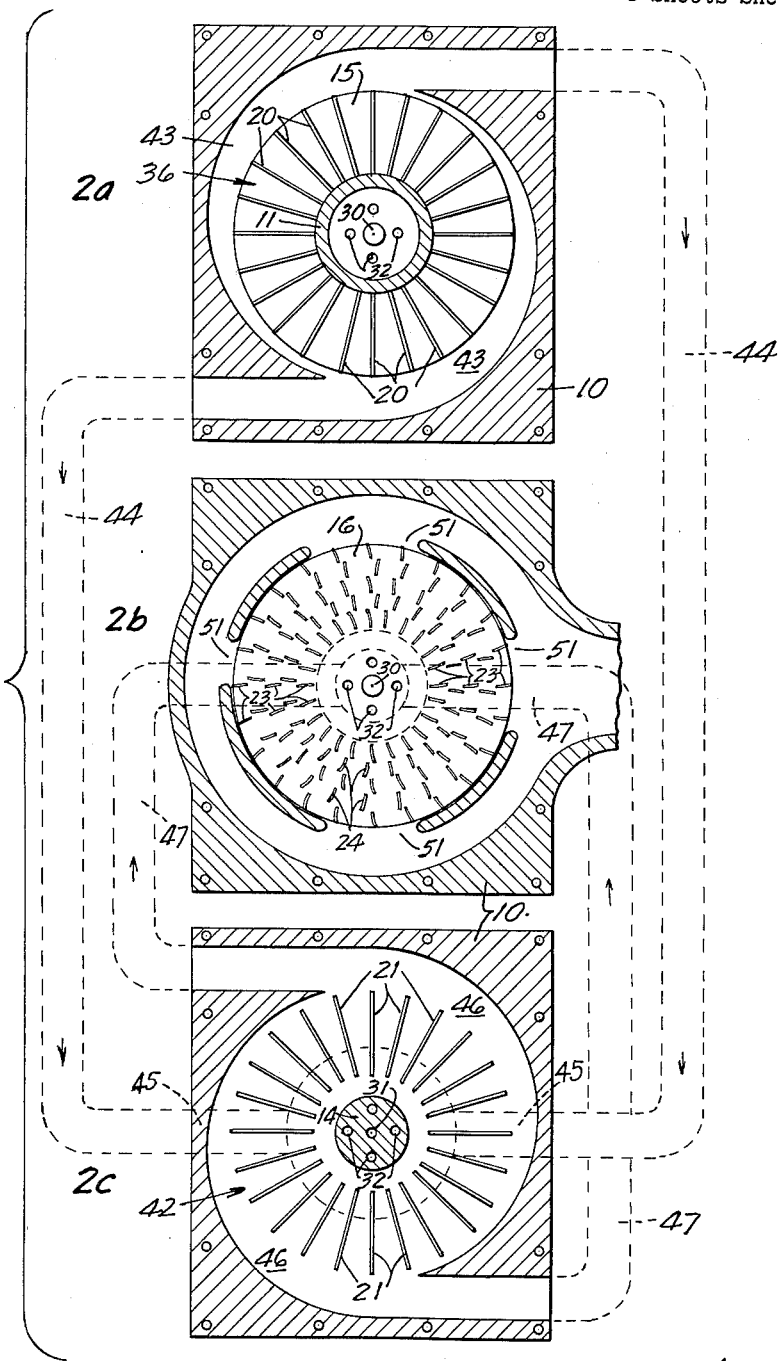

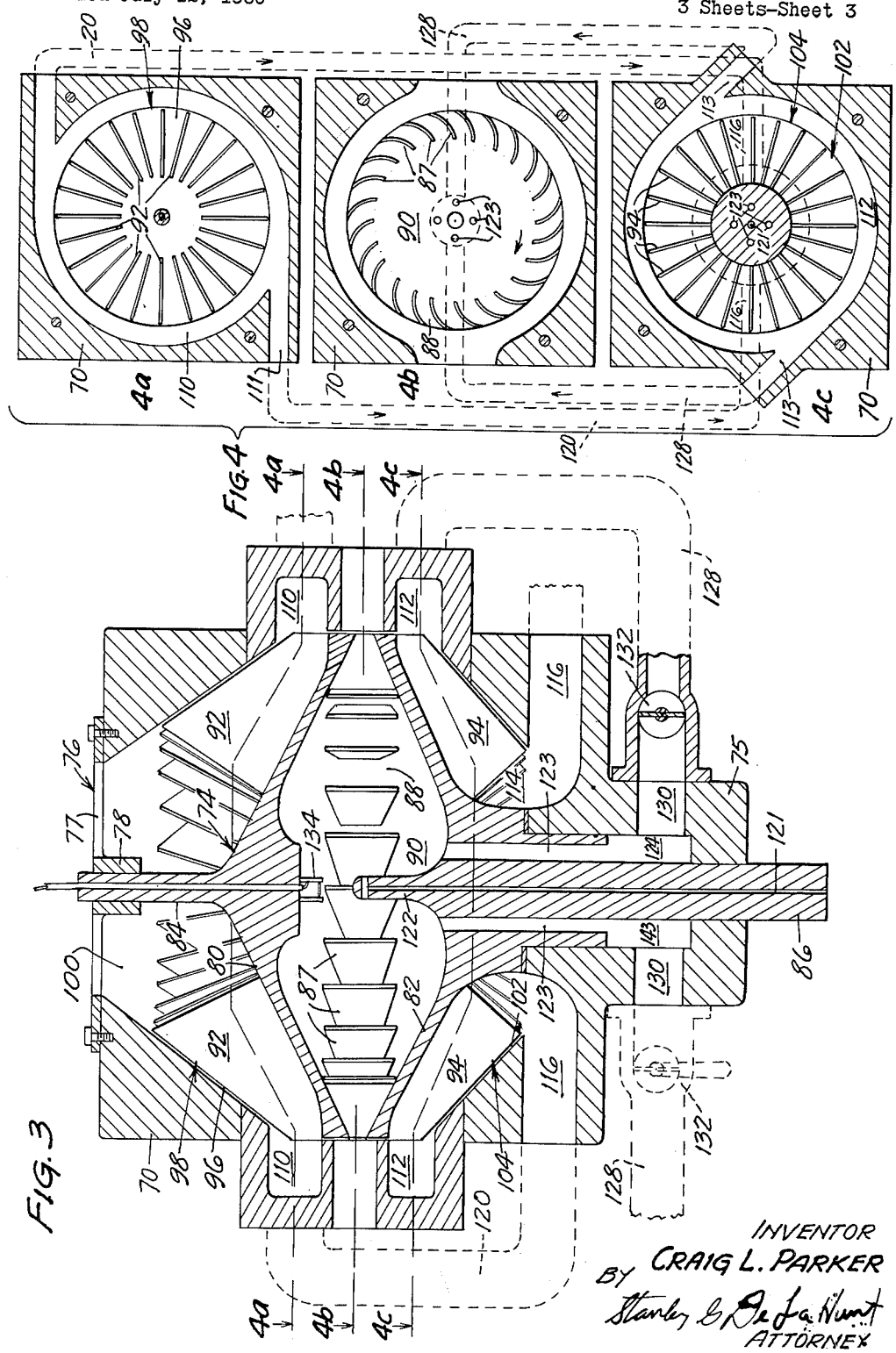

United States Patent Office 3,027,716
Patented Apr. 3, 1962

3,027,716
RADIALLY-EXPLODING GAS TURBINE ENGINE
Craig L. Parker, Roseville, Minn.
(2772 Virginia, St. Paul 17, Minn.)
Filed July 12, 1960, Ser. No. 42,374
5 Claims. (Cl. 60—39.35)

The present invention relates to radially-exploding gas turbine engines.

While there are presently being utilized in commerce highly successful gas turbine engines, the same, by and large, involve complex apparatus and, because of the extreme temperatures at which the engines operate, must be at least in part manufactured of expensive extremely high heat resistant metals and alloys. For instance, the turbine blades of prior art engines characteristically, because of the tremendously high temperatures under which they must function, are constructed of special alloys. Even though maintenance costs are relatively low and operating efficiencies high, nevertheless, because of their expensive construction turbine engines have not attained practicability as a basic power source. To the best of my knowledge, no one, prior to the present invention, has provided an exploding gas rotary turbine engine of such character and design that it can be constructed of common readily available materials such as high grade steels.

In accordance with my invention I provide a novel turbine engine which is simple in its design and which runs at relatively low temperatures as compared with the gas turbine engines in present commercial use. As a result of the unique construction of my engine, blades of the air compressors are utilized directly as a means for dissipating heat from the turbine. Even the most rigorously exposed parts of my engine can be composed of such relatively inexpensive and readily available materials as high grade steels. Further, where desired, substantial amounts of otherwise wasted heat and energy can be directly utilized to raise the energy level of incoming gases.

The manner in which these and numerous other objects and advantages of the present invention are achieved will be apparent from the following description of illustrative embodiments of my invention, including the accompanying drawings, wherein like reference characters refer to corresponding parts in the several views, and in which:

FIGURE 1 is a side elevation, partially cut away, and partially schematic in nature, showing one embodiment of the present invention;

FIGURE 2 constitutes a series of three section views 2a, 2b and 2c, respectively, taken along the lines 2a—2a, 2b—2b and 2c—2c, of FIGURE 1, showing various compressor and turbine components of my engine, the piping connections between the compressor and turbine chambers in the three views being schematically indicated in broken lines;

FIGURE 3 is a side elevation, largely in section, of a different embodiment of my invention; and FIGURE 4 is a series of three section views 4a, 4b and 4c, respectively taken along the lines 4a—4a, 4b—4b and 4c—4c, of FIGURE 3, showing various compressor and turbine components of my engine, the piping connections between compressor and turbine chambers in the three views being schematically indicated in broken lines.

Referring now to FIGURES 1 and 2, a preferred embodiment of my novel turbine engine is seen to comprise an engine housing 10, mounted on a supporting frame (not shown), which housing contains a pair of axially aligned turbine rotors 11 and 12. Said rotors 11 and 12 comprise a shaft member 13 and 14, respectively, and terminate within the housing in opposed spaced discs 15 and 16. Rotor 11 is supported within the engine housing by a bearing block 17 through which extends the rotor shaft 13, the bearing block 17 being mounted on the engine frame. Rotor 12 is similarly supported through its shaft 14 which extends through annular rearward extension 18 of housing 10. In each instance, the shafts 16 and 18 are appropriately mounted in thrust bearings (not shown).

In the interest of smooth gas flow, the exterior of the disc members 15 and 16 of rotors 11 and 12 are smoothly filleted where they join shafts 13 and 14, respectively.

The forward surface of disc 15 of rotor 11 is provided with forwardly jutting radial spaced compressor blades 20. Similarly, the rearward surface of disc 16 of rotor 12 is provided wtih many rearwardly jutting radial spaced compressor blades 21.

At their radially inner portions, where discs 15 and 16 of rotors 11 and 12 join with their respective shafts 13 and 14, discs 15 and 16 are hollowed out to define, when the rotors are in their mutually opposite position, a combustion chamber 22. Radially outwardly of the combustion chamber the discs 15 and 16 define a turbine chamber 19 wherein they are provided on their inner opposed surfaces with many turbine blades 23 and 24 disposed perpendicularly with respect to said discs. The turbine blades 23 are affixed to disc 15 in general diametral alignment (FIGURE 2b) and are also spaced radially (FIGURE 1). The blades 24 are similarly positioned on disc 16 of rotor 12 but are so spaced radially that they extend between the blades 23 of disc 15 in alternate staggered relation. The turbine blades 23 are curved and canted (FIGURE 2b) so that gas driven thereagainst will cause rotor 11 to rotate in one direction, while blades 24 are curved and canted in the opposite direction so that rotor 12 will be driven in the opposite direction.

A fuel introduction nozzle 30 extends axially at the center of combustion chamber 22 for injecting fuel into the combustion chamber through axial passage 31 extending along shaft 14 from a central-flow fuel supply (not shown). Shaft 14 is also provided with a series of lengthwise extending air introduction passages 32 clustered about fuel injection passage 31. These air introduction passages 32 terminate at their rearward ends in a circumferential groove 33 in shaft 14.

Housing 10 is provided at its forward end with a flared tapered annular flange 34 extending closely about compressor blades 20 and spaced from disc 15. The space between the disc 15 and said flange defines an annular first stage compressor chamber 35 which together with blades 20 constitutes the first stage compressor 36. Chamber 35 is open at intake 37 at the forward end of the engine. The sidewalls of chamber 30, i.e., disc 15 and flange 34, converge in the radial outward direction in conformation with the contour of the compressor blades.

The rear of housing 10 extends about shaft 14 and, by an annular extension 40, closely houses rearwardly jutting compressor blades 21. Thus is defined second compressor chamber 41, which, together with blades 21, form second stage compressor 42. The walls of said chamber 41 (defined by extension 40 and disc 16) converge in the radially outward direction in conformance with the shape of blades 21.

Just opposite the radially outer periphery of the first stage compressor 36, housing 10 is provided with a plurality (here two) of tangential exit ports 43 (FIGURE 2a) to which conduits 44 are connected at one end thereof. The opposite end of said conduits 44 are reconnected to housing 10 so as to communicate with second stage intake port 45 provided in housing 10. Said ports 45, of course, communicate with the radially inner portion of second stage compressor chamber 41.

Similarly, just opposite the radially outer periphery of the second stage compressor 42, housing 10 is provided with tangential exit ports 46 (FIGURE 2c) to which in turn are connected conduits 47 for the removal of second stage compressed gases and transfer thereof to the combustion chamber. The opposite end of conduits 47 communicate with radial ports 48 in rear annular extension 18 of housing 10. Said ports 48 are disposed opposite annular groove 33 in shaft 14 of the compressed air introduction system. Thus compressed air from the compressors is transported by its own pressure flow into combustion chamber 22, after passing through said conduits 47, ports 48, annular groove 33 and finally air introduction passages 32.

Valves 50 are interposed in conduits 47 whereby the flow of compressed air into the combustion chamber 22 is controlled, thereby (together with control of fuel injection) the rotative speed of the engine is controlled.

Between the exit systems for the compressors, and peripherally opposite the turbine, housing 10 is provided with exhaust vents 51 by which gases from the turbine are exhausted into the air; although an exhaust manifold system for directing flow of the exhaust gases to a desired place can be utilized if desired.

A hot wire electrode 52 is sealed into shaft 13 of rotor 11 and extends into the combustion chamber, this electrode being appropriately connected through a dynamic contact (not shown) to a source of power for heating the electrode to a glowing heat.

At their outer ends, each of shafts 13 and 14 is appropriately connected through a power takeoff through which power is transmitted to a single drive shaft, it being borne in mind that shafts 13 and 14 rotate in opposite directions when the turbine engine is operating. Preferably the power takeoff is so connected that each of shafts 13 and 14 is transmitting power to the drive shaft when they are rotating at the same speeds.

It will be seen that my novel engine operates in a rather simple fashion. Through a booster or starter engine, shafts 13 and 14 of rotors 11 and 12 are initially rotated in appropriate opposite directions. With the rotation of rotor 11, intake air is drawn into intake chamber 35 by the action of first stage compressor blades 38. The intake air is compressed continuously within first stage compressor 36 and expelled through conduits 44 and transferred into second stage compressor 42. From there the two-stage compressed air is transferred through conduits 47, valves 50, ports 48 and passages 32 into combustion chamber 22. There the compressed air is mixed with injected fuel introduced through passage 31 and the fuel mixture is exploded initially by virtue of the heat emitted by hot wire 52. The exploding gases exert forces on the turbine blades 23 and 24 whereby the rotors 11 and 12 are driven oppositely. As above noted, the area and degree of cant of the various turbine blades 23 and 24 are so adjusted that the maximum possible energy of the exploded combustion gases is utilized prior to the expulsion thereof through exhaust vents 51.

As the heat within combustion chamber 22 mounts, the combustion mixture can be ignited without the aid of hot wire electrode 52.

It will be seen that in the areas of the turbine where the combustion gases are the hottest, i.e., in the area of the turbine blades 23 and 24, the heat readily will be transmitted across the wall of discs 15 and 16 into compressor blades 20 of the first stage compressor 36 and blades 21 of the second stage compressor 42. These compressor blades thus serve as cooling fins for the turbine, the compressed air being driven through the compressors serving to remove heat energy from the compressor blades, the usable energy of the compressed gases thus being increased. Accordingly, it is unnecessary that my novel turbine engine be made of highly heat resistant costly alloys, but rather may be composed of a good grade of steel or equivalent.

The engine above described operates particularly efficiently at high rotative speeds, because the relative speed between the oppositely rotating turbine blades is twice the rotative speed of either of the shafts. Hence, a relative rotative velocity of the turbine can be achieved within the turbine far exceeding the permissible rotative speeds of either of the shafts, as governed by the strength of the materials, etc. of which the engine is constructed.

Referring now to FIGURES 3 and 4, a somewhat different modification of my engine is shown.

Housing 70 is provided with a large central chamber within which rotates turbine rotor 74. Said rotor is appropriately mounted on bearings (not shown) within a rearward extension 75 of housing 70 at the rearward end thereof, and within "spider" frame 76 at its forward end. By "spider" frame I mean a frame the area of which is mostly open so air can pass through with a minimum of interference, said frame being composed of radiating legs or spokes 77 affixed to housing 70 at their outward ends and supporting the rotor retaining center portion 78 at their inner ends.

Basically the turbine rotor comprises a pair of opposed concavo-convex discs 80 and 82 assembled coaxially with their concave surfaces facing one another, said discs being respectively affixed on the ends of shafts 84 and 86. The discs 80 and 82 are joined to the opposite ends of a plurality of curved turbine blades 87 extending perpendicularly with respect of said discs, the rotor 74 thus being rigidly unified. Blades 87 are disposed in general radial relation and are canted and curved (FIGURE 4b) so that gases driven thereagainst cause the rotor 104 to rotate about shafts 84 and 86. Defined between the discs 80 and 82 is the turbine chamber 88 which is rather large at the center but whose side walls converge in the radially outward direction. The central area between discs 80 and 82 serves as the combustion chamber 90. By virtue of the radially convergent side walls of the turbine chamber, the velocity of the exhaust gases is increased substantially as they travel radially outwardly the turbine rotor. Thereby the driving force of the exploded gases onto the turbine blades 87 is materially increased.

The forward (exterior) surface of disc 80 is provided on the radially outer portion thereof with first stage compressor blades 92. The rear (exterior) surface of disc 82 similarly is provided with second stage compressor blades 94. Housing 70 is conformed closely about the forward edges of first stage compressor blades 92 and defines with the exterior surface of disc 80 a first compressor chamber 96. The walls of the compressor chamber converge in the radially outward direction. Chamber 96 and the first stage compressor blades 92 together thus define first stage compressor 98. The forward end of housing 70 is open at intake 100 except for the frame or spider 76 which supports the forward bearing for rotor 74. Thus intake air forced or drawn into the intake 100 at the forward end of the housing 70 passes into first stage compressor 98.

Housing 70, adjacent second stage compressor blades 94, is conformed about said blades to define, together with rotor disc 82, a second compressor chamber 102 similar to first stage compressor chamber 96. Said chamber 102 together with second stage compressor blades 94 forms the second stage compressor 104.

As shown particularly in FIGURE 4a, an annular space 110 is provided opposite the outer periphery of the first stage compressor 98. Tangential exit ports 111 join with the annular space through which first stage compressed air is removed from the compressor. A similar annular space 112 and tangential exit ports 113 are provided opposite the outer periphery of second stage compressor 104 (FIGURE 4c).

The main central chamber in housing 70 is open as shown adjacent the radially inner end of second stage compressor 104 to define an annular second stage intake 114. Radial intake ports 116 communicate said intake 114 with the exit of first stage compressor 98 through the tangential exit ports 111 and connective conduits 120.

Shaft 86 is also provided with an axial fuel introduction port 121 emanating from a flow-controlled supply source, said fuel introduction port culminating centrally of the combustion chamber 90 at nozzle 122. Clustered about the fuel introduction port 121 is a series of lengthwise extending compressed air introduction ports 123 which terminate rearwardly into an annular space 124 defined about shaft 86 of rotor 74 within the rearward extension 75 of housing 70. The annular space 124, in turn, communicates with the exit of second stage compressor 104 through the tangential second stage exit ports 113 (FIGURE 4c), conduits 128 and chamber entry ports 130, the latter being radially situated in rearward extension 75 of housing 70. Valves 132 are interposed in conduits 128 for controlling flow of compressed air into the combustion chamber 90. These valves, together with control of fuel injected through nozzle 122, control the rotative speed of the engine. Only these two controls are necessary to operate my engine.

In the embodiment as shown, the housing is open radially outwardly of the turbine chamber so that the exhaust gases may be expelled into the air. If desired, of course, an exhaust manifold could be employed.

A hot wire electrode 134 is provided in the forward shaft of rotor 74. A lead to the electrode is connected to an appropriate power source through a dynamic contact connection (not shown).

The engine shown in FIGURES 3 and 4 operates as follows: power is applied to the hot wire electrode 134 heating said electrode to a glowing incandescent state. With the aid of a booster motor, rotor 74 is caused to rotate in the appropriate direction. Simultaneously, fuel is injected through fuel introduction port 121 and nozzle 122 into the combustion chamber 90. Meanwhile, as a result of the booster rotation of the rotor 74, outside air is drawn through intake 100 into first stage compressor 124 and compressed. It is then transferred into second stage compressor 96 and again compressed. It is then introduced through ports 123 into the combustion chamber 90 in its doubly compressed state. The compressed air is then mixed with the injected fuel and the same caused to explode by virtue of the hot wire electrode 134. The exploded expanded gases impinge against turbine blades 87 (driving them), are then forced outwardly past the turbine blades and through the narrow annular gap between discs 80 and 82 of rotor 74 at the outer peripheries thereof, and thence are exhausted. After the engine has attained some minimum speed, the booster no longer is necessary and the engine thereafter operates under its own power. Also, the power to the hot wire electrode can be disconnected, the residual heat within the combustion chamber being sufficient continuously to explode the mixture of fuel and compressed air mixture within the combustion chamber. After removal of the booster, the shaft of the turbine rotor 74 is appropriately engaged with a power takeoff (not shown) to be utilized for work as desired.

It will be seen that heat from the hot exploding gases rushing past the turbine blades 87 is conducted through discs 80 and 82 of turbine rotor 74 to the compressor blades 92 and 94 to be radiated away. In turn, the intake air into the two compressors absorbs heat radiated from the compressor blades. Thus, my engine operates at a relatively low operating temperature, even in the turbine components.

While I have described my invention with the aid of several specific embodiments, various modifications coming within the spirit of my invention undoubtedly will suggest themselves. For example, an engine utilizing a single stage compression can be made utilizing the principles hereof, only one turbine rotor disc being then necessary (the turbine and combustion chambers being then defined in part by the engine housing), the turbine disc containing turbine blades on one side and compressor blades on the other. Such variations are contemplated, and it is to be understood that it is not my intent to be limited to the specific illustrative embodiments detailed. Rather, I intend to be limited only to my disclosure taken as a whole, including the appended claims.

I claim:

1. In a radially exploding gas turbine engine, a housing, turbine rotor means rotatably disposed within said housing, a rotary disc wall on said rotor means defining on one side thereof a radially outer turbine chamber and a generally central combustion chamber, said wall defining on the other side thereof in conjunction with said housing a compressor chamber, turbine blades affixed to said wall on said one side thereof and extending within said turbine chamber, compressor blades affixed said wall on said other side and extending into said compressor chamber, access means for introducing gas to the inlet of said compressor, and means for transporting gas compressed in said compressor to said combustion chamber.

2. In a radially exploding gas turbine engine, a housing, turbine rotor means mounted for rotation within said housing, said rotor means comprising a pair of rotatable disc walls disposed on shafts defining therebetween a radially outer turbine chamber and a generally central combustion chamber, and turbine blades affixed to said walls therebetween and extending into said turbine chamber; said walls on the sides thereof opposite said turbine chamber each defining in conjunction with said housing a compressor chamber, and compressor blades affixed to each of said walls on the side thereof opposite said turbine blades and extending into said compressor chambers to define therewith rotary compressors, access means for introducing gas to the inlet of one of said rotary compressors; means for transporting air compressed by said one compressor around said turbine chamber and combustion chamber to the inlet of the other of said compressors; and means for transporting further-compressed gas from said other compressor to said combustion chamber.

3. A radially exploding gas turbine engine comprising: a housing; a pair of axially aligned turbine rotors mounted for rotation within said housing on shafts, said rotors terminating within said housing in opposed spaced disc walls defining therebetween a radially outer turbine chamber and a generally central combustion chamber, turbine blades affixed to each of said walls generally perpendicularly thereto and extending into said turbine chamber, said turbine blades of each rotor being in generally diametrical alignment and also radially spaced with the turbine blades of one rotor disposed in alternated staggered relation to those of said other rotor, said blades being canted such that radially outwardly traveling gases impinging thereon will drive said rotors in opposite directions, said rotor walls on the sides thereof opposite said turbine chambers each defining in conjunction with said housing a compressor chamber; compressor blades affixed to each of said rotor walls on the side thereof opposite the turbine blades and extending respectively into said compressor chambers and defining therewith rotary compressors, said compressor blades being appropriately canted to compress air passing radially outwardly through the compressor chambers when said rotors are being driven by gases passing radially outwardly through said turbine chamber; means for exhausting gases from the outer periphery of said turbine chamber; gas introduction passages extending within the shaft of one of said rotors opening into said combustion chamber; an intake in said housing communicative to the exterior thereof with the radially inner portion of one of said compressor chambers; conduit means for transferring gases from the outer periphery of said one compressor chamber to the radially inner portion of the other compressor chamber; conduit means for transferring gases from the outer periphery of said outer compressor chamber to said air introduction passages; and means for introducing fuel into said combustion chamber.

4. A radially exploding gas turbine engine comprising: a housing; a rotor mounted for rotation within said housing on shafts, said rotors terminating within said housing in opposed spaced disc walls defining therebetween a radially outer turbine chamber and a generally central combustion chamber, turbine blades disposed between said walls generally perpendicular thereto in said turbine chamber, said turbine blades being affixed at one end thereof to one of said disc walls and at the other end thereof to the other of said disc walls rigidly unifying said rotors, said turbine blades being canted such that radially outwardly traveling gases impinging thereof will rotatably drive said rotors, said rotor walls on the sides thereof opposite said turbine chambers each defining in conjunction with said housing a compressor chamber; compressor blades affixed to each of said rotor walls on the side thereof opposite the turbine blades and extending respectively into said compressor chambers and defining therewith rotary compressors, said compressor blades being appropriately canted to compress air passing radially outwardly thorough the compressor chambers when said rotor is being driven by gases passing radially outwardly through said turbine chamber; means for exhausting gases from the outer periphery of said turbine chamber; gas introduction passages extending within one of said shafts of said rotor opening into said combustion chamber; an intake in said housing communicative to the exterior thereof with the radially inner portion of one of said compressor chambers; conduit means for transferring gases from the outer periphery of said one compressor chamber to the radially inner portion of the other compressor chamber; conduit means for transferring gases from the outer periphery of said other compressor chamber to said air introduction passages; and means for introducing fuel into said combustion chamber.

5. In a radially-exploding gas turbine engine, a housing, turbine rotor means mounted for rotation within said housing, said rotor means comprising a pair of rotatable disc walls disposed on shafts defining therebetween a radially outer turbine chamber and a generally central combustion chamber, and turbine blades affixed to said walls therebetween and extending into said turbine chamber; said walls on the sides thereof opposite said turbine chamber each defining in conjunction with said housing a compressor chamber, and compressor blades affixed to each of said walls on the side thereof opposite said turbine blades and extending into said compressor chambers to define therewith rotary compressors, said compressor blades being appropriately canted to compress air passing radially outwardly through the compressor chambers when said rotor means is being driven by gases passing radially outwardly through said turbine chamber; access means for introducing gas into the radially inner portion of one of said compressors, conduit means for transferring gases from the outer periphery of said one compressor to the radially inner portion of the other compressor; and conduit means for transferring gases from the outer periphery of said other compressor to said combustion chamber.

References Cited in the file of this patent
UNITED STATES PATENTS

| | | |
|---|---|---|
| 1,868,143 | Heinze | July 19, 1932 |

FOREIGN PATENTS

| | | |
|---|---|---|
| 656,337 | Great Britain | Aug. 22, 1951 |
| 801,281 | Great Britain | Sept. 10, 1958 |